Nov. 9, 1965 L. PERÁS 3,216,740
MOUNTING OF WHEEL SUSPENSION ARMS OF VEHICLES
Filed March 11, 1964
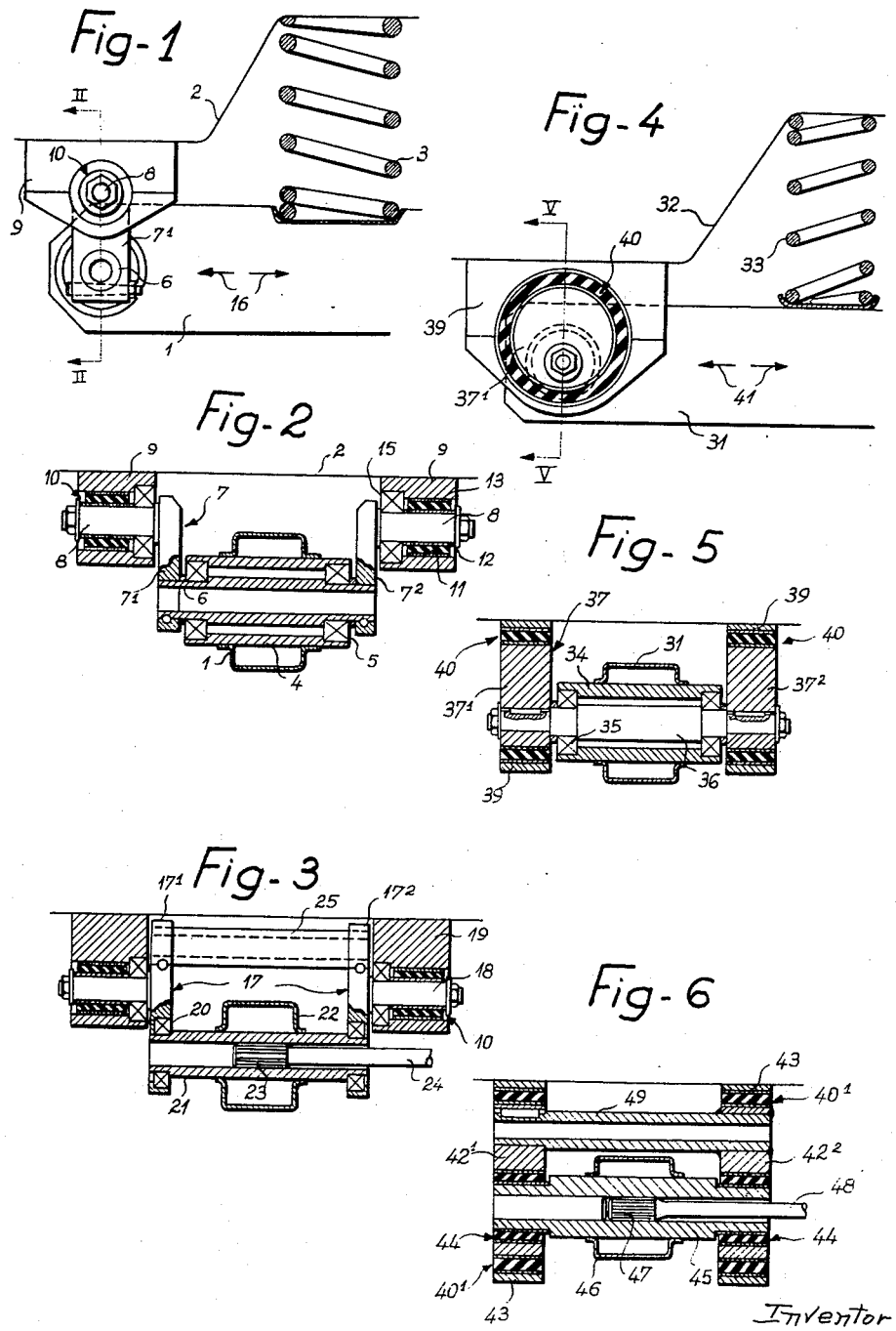
Inventor
Lucien Peras
By Stevens, Davis, Miller & Mosher
Attorneys

United States Patent Office 3,216,740
Patented Nov. 9, 1965

3,216,740
MOUNTING OF WHEEL SUSPENSION
ARMS OF VEHICLES
Lucien Perás, Billancourt, France, assignor to Regie
Nationale des Usines Renault, Billancourt, France
Filed Mar. 11, 1964, Ser. No. 351,122
Claims priority, application France, Mar. 13, 1963,
927,830, Patent 1,359,271
5 Claims. (Cl. 280—124)

This invention relates to a mounting of a wheel suspension arm of vehicle, this mounting being adapted in addition to the function of conventional suspension systems designed essentially for vertical deflection as a function of the load carried by the wheel, to permit a certain longitudinal elastic movement in relation to the vehicle body so as to prevent the shocks applied to the wheel in the direction of motion of the vehicle from being transmitted directly to the vehicle body as in the case of conventional suspension systems.

This invention is concerned more particularly with a mounting for a longitudinal wheel carrier arm, wherein the wheel carrier arm is connected through a pivot pin to a support mounted for elastic pivotal motion on the vehicle body about an axis parallel to said pivot pin, and wherein said pivotal support is mounted in a separate bracket rigidly secured on the vehicle body with the interposition of elastic torsion means disposed on either side of said pivotal support.

Various forms of embodiment of a wheel carrier arm mounting of the character broadly set forth hereinabove are described hereinafter by way of example with reference to the accompanying drawing, in which:

FIGURE 1 is a fragmentary side elevational view showing the mounting of a wheel suspension or carrier arm according to this invention;

FIGURE 2 is a section taken upon the line II—II of FIGURE 1;

FIGURE 3 is a view similar to FIGURE 2 but showing a modified form of embodiment;

FIGURE 4 is a fragmentary side elevational view showing a different form of embodiment of the suspension mounting;

FIGURE 5 is a section taken upon the line V—V of FIGURE 4; and

FIGURE 6 is a view similar to FIGURE 5 showing a modified embodiment of the wheel suspension mounting.

Referring first to FIGURES 1 and 2 of the drawing, a wheel carrier or suspension arm 1 is hingedly or pivotally mounted in relation to the vehicle body or frame 2, the spring means consisting in this case of a coil compression spring 3, a road or like wheel (not shown) being mounted on the opposite end of the suspension arm 1 extending longitudinally to the vehicle.

This arm 1 is pivotally mounted by means of a socket 4 and bearings 5 about a transverse pin 6 having its ends keyed or otherwise safely fastened to the lower ends of a depending swinging support 7 consisting of a pair of parallel links 7¹, 7². These links carry at their upper ends opposed trunnions or journals 8 extending transversely to the vehicle and pivotally mounted in turn in brackets 9 rigidly secured to the vehicle body.

It will be noted that these trunnions 8 are mounted in the brackets 9 with the interposition of Silentblocs or like resilient torsion blocks 10 consisting in this example according to the known technique of a rubber sleeve or block 11 cemented on a pair of inner and outer sockets 12, 13, respectively, mounted on the trunnion 8 and in the corresponding bracket 9, respectively, whereby any pivoting movement impressed to the trunnions 8 applies a torsional stress to the rubber sleeves 11.

These elastic sleeves or blocks may also be fastened directly to the trunnions and corresponding brackets. Any other suitable elastic torsion device or block may be used for this purpose. Moreover, ball or roller bearings 15 may be fitted between the trunnions 8 and the brackets 9 to relieve the torsion blocks from any stress other than torsional stresses. In this connection it may be noted that the pivotal mounting of arm 1 on pin 6 could also be effected by means of elastic bushings or blocks instead of bearings.

During the driving of the vehicle, the suspension spring 3 absorbs the vertical shocks transmitted through the wheel carrier arm 1 as it swings about its pivot pin 6, and the shocks applied to the wheel in the direction of motion of the vehicle (arrow 16) produce an angular movement of support 7, thus damping out efficiently these shocks by applying torsional stresses to the blocks 10 which tend to restore the support 7 to its normal position of equilibrium, i.e. its substantially vertical position.

The resulting longitudinal beat of wheel carrier arm 1 is permitted as far as the operation of suspension spring 2 is concerned.

FIGURE 3 illustrates on the other hand a similar wheel carrier arm mounting in the case of a torsion bar suspension system.

The pivotal support 17 is provided with integral trunnions 18 mounted in brackets 19 as in the preceding case with the interposition of resilient torsion blocks 10.

The pivot pin 21 of wheel carrier arm 22, which is rigid with this arm, is mounted for free rotation by means of bearings 20 on the pivotal support 17. The pivot pin 21 is hollow and formed with inner splines engaged according to the conventional construction by male splines 23 formed on the corresponding end portion of a torsion bar 24 constituting the suspension spring, the opposite end of this torsion bar being anchored in the known manner in a fixed portion of the vehicle frame or body. In this alternate embodiment the support 17 consists of two links 17¹, 17² interconnected by an additional tie-rod 25 constituting an anti-torsion element of the support whereby the links 17¹, 17² are compelled to pivot bodily through the same angle when the support 17 is moved angularly by suspension shocks applied to the wheel in the direction of motion of the vehicle.

The angular movement of support 17 will thus produce a permissible flexion of the torsion bar.

On the other hand, various forms of embodiments characterized by reduced over-all dimensions in comparison with the preceding construction and by the possibility of advantageously increasing the dimensions of the elastic torsion blocks or sleeves are illustrated in FIGURES 4 to 6 of the drawing.

FIGURES 4 and 5 illustrate the mounting of a wheel suspension arm 31 in relation to the vehicle body 32 when using a suspension spring such as a coil spring 33 reacting against the arm intermediate its pivotal mounting and the wheel (not shown). The arm 31 is mounted by means of an intermediate sleeve 34 and bearings 35 on a pivot pin 36 having its ends locked for example by keying, as shown, in a support 37 consisting of a pair of eccentric discs 37¹, 37² having said pin 36 as their common crankpin, these eccentric discs being pivotally mounted in a pair of brackets or bearings 39 rigidly secured on the vehicle body, with elastic torsion blocks or sleeves 40 fitted between the discs and the brackets, as shown.

These elastic blocks 40 have the same function as blocks 10 of the first form of embodiment in that they absorb the shocks applied to the wheel in the direction of the arrow 41, these shocks, due to the eccentric mounting of the wheel arm on the support 37, producing a swinging movement of this support in its brackets 39, this movement being damped out by the elastic torsion stress thus produced in the blocks 40.

FIGURE 6 illustrates a similar wheel carrier arm mounting in the case of a torsion bar suspension system.

This arrangement comprises a support incorporating two eccentric discs $42^1$, $42^2$ pivotally mounted in brackets 43 secured on the vehicle body with the interposition of elastic torsion blocks $40^1$. Between these eccentric discs a crankpin-forming trunnion is pivotally mounted by means of elastic bushings 44, 44, this trunnion constituting the pivot pin 45 of the wheel carrier arm 6 of which it is an integral part.

The pivot pin 45 is hollow and formed with inner splines co-acting as already set forth with male splines 47 formed on the end of a torsion bar 48 constituting the torsion spring. The eccentric discs $42^1$, $42^2$ are also interconnected by a tie-rod 49 constituting an anti-torsion member whereby these discs are compelled to pivot bodily with each other when they are subjected to an angular movement as a consequence of suspension shocks applying torsional stresses to the elastic blocks 40.

Of course, various modifications may be brought to the forms of embodiment of the invention which are shown and described herein by way of example, without departing from the spirit and scope of the invention as set forth in the appended claims.

I claim:

1. A vehicle wheel suspension comprising a vehicle frame and a vehicle wheel arm which is longitudinal with respect to the frame, a pivot pin on which the said wheel arm is pivotally mounted, a pair of crank arms each connected at one end to each end of said pivot pin, a pair of mounting pins each connected to the other end of each of said crank arms, an annular elastic torsion block mounted on each of said mounting pins, two brackets carried by said frame, said brackets carrying said torsion blocks, an anti-friction bearing rigidly carried by said brackets and surrounding and engaging each of said mounting pins whereby a torsionally elastic connection is defined between the frame and each of the said crank arms.

2. A vehicle wheel suspension comprising a vehicle frame and a vehicle wheel arm which is longitudinal with respect to the frame, a pivot pin on which the said wheel arm is mounted, a support for the said pivot pin comprising two similar support members extending laterally on both sides of said pivot pin and of said wheel arm, each support member having a mounting pin parallel to and coupled with said pivot pin, said pivot pin being eccentrically mounted with respect to said mounting pin, two annular elastic torsion blocks mounted on said mounting pins, two bearing members carried by said frame, said bearing members carrying said torsion blocks, whereby a torsionally elastic connection is defined between the frame and each of the said support elements of the pivot pin of the wheel arm.

3. A vehicle wheel suspension comprising a vehicle frame and a vehicle wheel arm which is longitudinal with respect to the frame, a pivot pin on which the said wheel arm is mounted, a support for the said pivot pin comprising two similar support members extending laterally on both sides of said pivot pin and of said wheel arm and rotatably carrying said pivot pin, each support member having a mounting pin parallel to and coupled with said pivot pin, two annular elastic torsion blocks mounted on said mounting pins, two bearing members carried by said frame, said bearing members carrying said torsion blocks, a torsion bar coaxially coupled to said pivot pin, whereby a torsionally elastic connection is defined between the frame and each of the said support elements of the pivot pin of the wheel arm.

4. The vehicle wheel suspension of claim 3 wherein said pivot pin has a hollow portion centrally axially thereof, said torsion bar having an enlarged portion fitting into said hollow portion and non-rotatably engaging the inner walls thereof.

5. The vehicle wheel suspension of claim 3 including a tie-rod extending between and having its ends coupled to said support members, said tie-rod being generally parallel to said pivot pin.

References Cited by the Examiner

UNITED STATES PATENTS

| | | | |
|---|---|---|---|
| 1,924,718 | 8/33 | Hallett | 267—67 |
| 2,303,568 | 12/42 | McWhorter | 267—57.1 X |
| 2,324,997 | 7/43 | Brown | 267—54 |
| 2,650,668 | 9/53 | Hopkins. | |
| 2,700,173 | 1/55 | Huffman | 267—57.1 X |
| 3,075,786 | 1/63 | Freers | 280—96.2 |
| 3,099,458 | 7/63 | Rosky | 280—96.2 |

A. HARRY LEVY, *Primary Examiner.*

LEO FRIAGLIA, *Examiner.*